Figure 1:
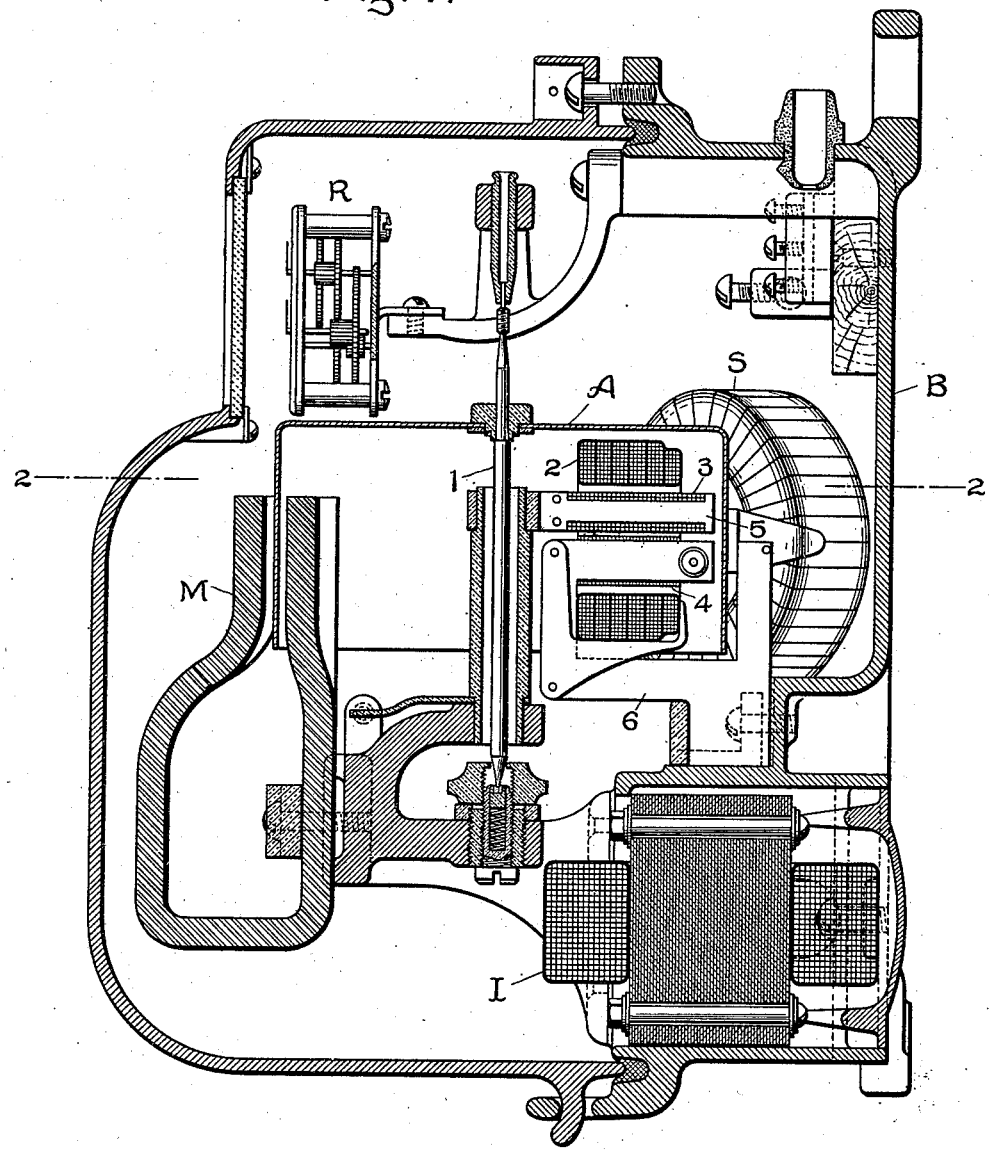

No. 671,283. Patented Apr. 2, 1901.
E. J. KING.
ELECTRIC METER.
(Application filed Jan. 31, 1901.)

(No Model.) 2 Sheets—Sheet 1.

Witnesses: Inventor:
Elton J. King,
by
Atty.

No. 671,283. Patented Apr. 2, 1901.
E. J. KING.
ELECTRIC METER.
(Application filed Jan. 31, 1901.)
(No Model.) 2 Sheets—Sheet 2.
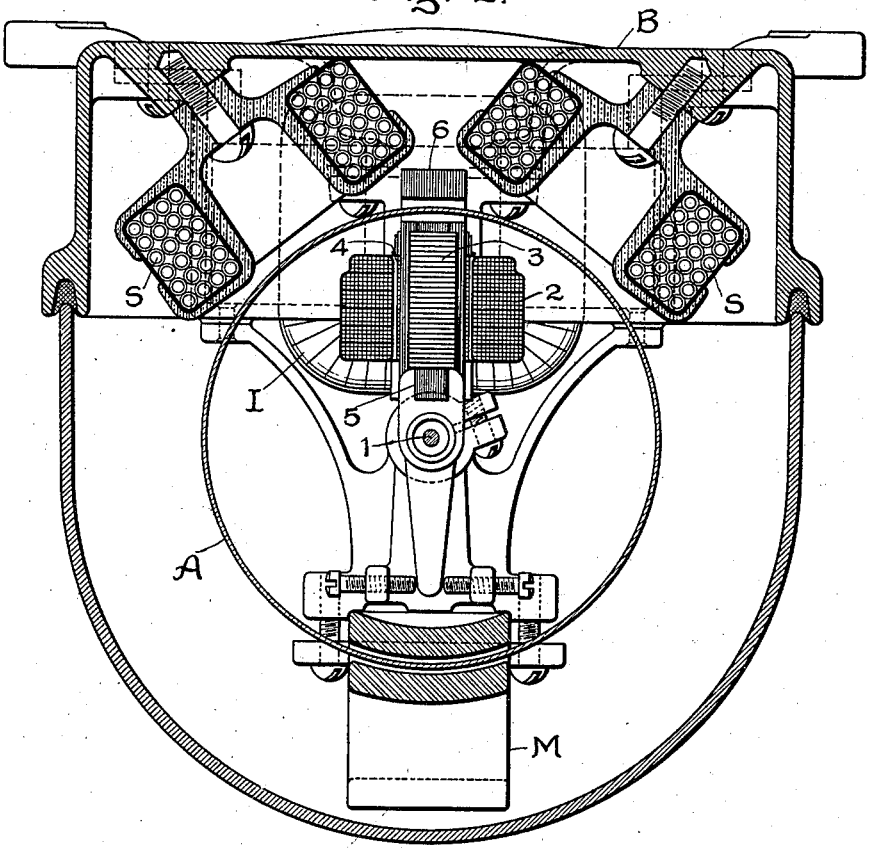
Fig. 2.
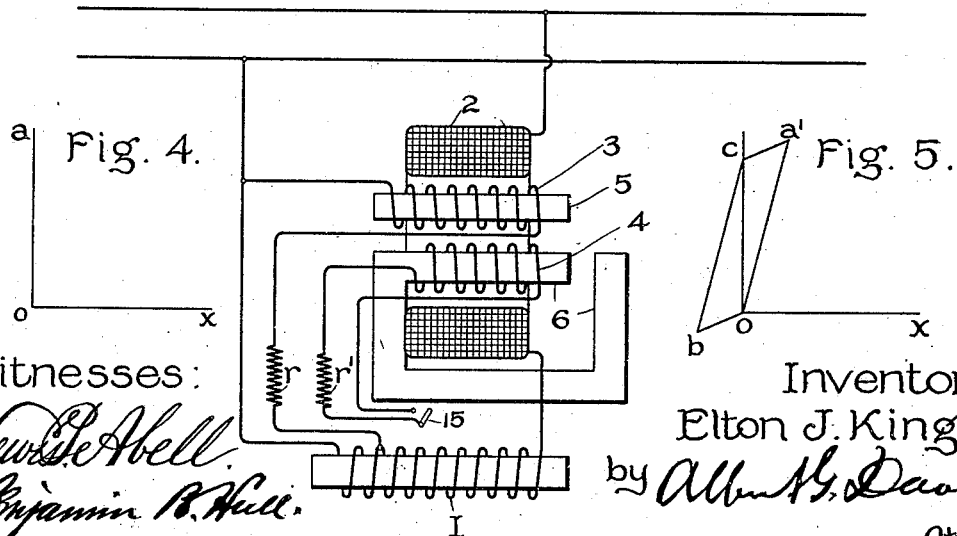
Fig. 3.
Fig. 4.
Fig. 5.
Witnesses:
Inventor:
Elton J. King,
by Albert G. Davis
Atty.

UNITED STATES PATENT OFFICE.

ELTON J. KING, OF FORT WAYNE, INDIANA, ASSIGNOR TO GENERAL ELECTRIC COMPANY, OF NEW YORK.

ELECTRIC METER.

SPECIFICATION forming part of Letters Patent No. 671,283, dated April 2, 1901.

Application filed January 31, 1901. Serial No. 45,502. (No model.)

*To all whom it may concern:*

Be it known that I, ELTON J. KING, a citizen of the United States, residing at Fort Wayne, county of Allen, State of Indiana, have invented certain new and useful Improvements in Electric Meters, (Case No. 1,688,) of which the following is a specification.

My invention relates to alternating-current electric meters, and has for its object to provide such a meter with a simple adjustment, by means of which it may be readily adapted for circuits supplied with currents of different frequencies.

I have illustrated my invention as applied to a wattmeter of the type shown in my pending application, Serial No. 2,117, filed January 20, 1900. In this type of meter it is essential for accurate registration of the energy consumed that the field due to the shunt-windings shall be displaced by ninety degrees from that due to the series windings on non-inductive load. If, however, the windings of such a meter are so proportioned that the proper phase relation exists when the meter is connected to a circuit supplied with current of one frequency the relation will be something other than ninety degrees when the meter is connected to a circuit supplied with current of a widely-different frequency, and therefore a meter which is designed for one frequency will not give an accurate registration on a circuit carrying currents of a widely-different frequency. When, therefore, two different frequencies are used in a distribution system—as, for example, when high-frequency currents are used for lighting purposes and currents of low frequency for motive power—it is necessary to employ two different classes of meters, one designed for the high frequency and the other for the low. By the use of my invention the same meter may be used for currents of either frequency. This result is accomplished by so arranging the shunt-windings of the meter that by the manipulation of a simple switch they may be caused to produce a field having the required phase displacement on either of the frequencies. Such an arrangement presents very considerable advantages not only when two different frequencies are employed in the same system, but also when, as is often the case, it is desired to change over a high-frequency system to one of low frequency. In this case the meters, if constructed in accordance with my invention, may be adapted for the new frequency by a simple mechanical manipulation, whereas with the constructions heretofore used it is necessary to remove the meters from the circuits and either replace them by others having their windings adapted for the lower frequency or else rearrange their windings and recalibrate them for the new frequency at which they are to be operated.

My invention will be better understood by reference to the following description, taken in connection with the accompanying drawings, in which—

Figure 1 is a vertical sectional view of the complete meter. Fig. 2 is a horizontal sectional view along the line 2 2 of Fig. 1. Fig. 3 is a diagram showing the arrangement of the shunt-windings of the meter. Fig. 4 is a diagram showing the phase relation of the field due to the main shunt-windings with reference to the electromotive force of the line on a circuit supplied with current of a certain predetermined frequency, and Fig. 5 is a diagram showing the effect of the adjusting device when the same meter is connected to a circuit of low frequency.

The mechanism of the meter which I have illustrated is mounted on a base B, from which brackets extend both at the top and bottom, carrying the bearings of a shaft 1, upon which a cup-armature A is mounted. The shaft is connected through the usual gearing (not shown) with the registering mechanism R. The actuating-windings for the armature A comprise two series coils S S and shunt-coils 2 and 3, together with an auxiliary winding 4. On the side of the armature away from the actuating-windings is mounted a retarding-magnet M, having its pole-pieces curved to include the depending portion of the motor-armature. The series coils are suitably supported from the back of the meter, so that they lie adjacent to the cylindrical surface of the armature A, and the shunt-windings, supported on the cores 5 and 6, are mounted inside of the depending portion of the armature, the core 6 being rigidly supported from the base of the meter and the core 5 being rotatably supported upon a sleeve surrounding the meter-shaft. The impedance-coil, by means of which the shunt-circuit is given the necessary self-induction, is mounted in a pocket at the base of the meter, as clearly shown in Fig. 1.

The circuit connections of the shunt-windings of the meter are shown in Fig. 3. The shunt-coil 2 is connected in series with the impedance-coil I across the mains of the system, and the coil 3, surrounding the core 5, is connected across a portion of the turns of the impedance-coil, a resistance $r$ being included in circuit therewith for the purpose of adjusting the resistance of the circuit.

In so far as the present application is concerned the winding 3 may operate merely to produce a component which, together with that due to the winding 2, gives a resultant shunt-field lagging by ninety degrees behind the electromotive force impressed on the meter-circuit. For this purpose it is of course unnecessary that it should be rotatably mounted. It is so mounted, as clearly explained in my prior application above referred to, in order that it may be adjusted to produce, in conjunction with the winding 2, a torque sufficient to compensate for the static friction of the meter without disturbing the phase displacement of the shunt-field as a whole.

In the operation of the meter the winding 2 produces a magnetic field which lags in the neighborhood of ninety degrees behind the electromotive force impressed upon the circuit to which the meter is connected. If the arrangement is such that the effect of said winding, in connection with the short-circuiting effect of the meter-armature, produces a shunt-field lagging by more than ninety degrees behind the impressed electromotive force, then the winding 3 on the adjustable core 5 will be so connected as to produce a counter-magnetization sufficient to give a resultant magnetic field lagging by substantially ninety degrees behind the impressed electromotive force. If, however, the magnetic circuit is of such a character and the impedance-coil is so constructed that the field due to the winding 2, together with that component due to the short-circuiting effect of the meter-armature, produces a shunt-field which lags by less than ninety degrees behind the impressed electromotive force, then the winding 3 will be connected in the reverse direction, so as to produce a component in the proper direction to cause a resultant field having the required ninety degrees relation. With the arrangement of windings which I have illustrated I find it possible on a high-frequency circuit to obtain a field due to the winding 2, modified, it may be, by the short-circuiting effect of the armature, which lags by more than ninety degrees behind the impressed electromotive force of the circuit. In this case I so connect the winding 3 that it produces a component in the proper direction to bring back the phase displacement of the resultant field to ninety degrees. When it is desired to connect the meter to a circuit of lower frequency, it is feasible, if the frequency is not too low, to merely open the circuit of the winding 3. This winding would then constitute the auxiliary winding and would take the place of the winding 4. Inasmuch, however, as the desired change is generally from a very high frequency—one hundred and twenty-five to one hundred and forty cycles—to a comparatively low frequency, such as sixty cycles, it is in practice advisable to employ one winding, such as 3, for adjusting the phase relation of the field on high frequency to ninety degrees and a separate winding, such as 4, acting in the arrangement of windings illustrated in this application in substantial opposition to the winding 3 for adjusting the meter for the lower frequency.

For the purpose of my present invention it is not essential that the particular arrangement which I have shown for attaining a ninety-degrees relation of the shunt-field should be used, it being sufficient if the windings are so arranged that on a circuit of a predetermined frequency the proper phase relation of the resultant shunt-field will be attained. My invention consists in providing such a meter with a simple adjusting device by the manipulation of which the effect of the shunt-winding as an entirety will be so changed that on a circuit of another different frequency a ninety-degrees relation shall also be caused to exist between the fields due to the shunt and series windings.

The operation of the particular embodiment of my invention which I have illustrated will be rendered clear by an inspection of the diagrams in Figs. 4 and 5. In the diagram of Fig. 4 let the line $o\,x$ represent the phase of the electromotive force impressed on the shunt-circuit of the meter. Then the line $o\,a$, lying at right angles thereto, will represent the phase of the resultant field produced by the shunt-windings 2 and 3 on a circuit of a certain predetermined frequency. If now the meter is connected to a circuit of much lower frequency—as, for example, if it is changed from a circuit in which the current has a frequency of one hundred and twenty-five to one hundred and forty cycles to a circuit carrying a current having a frequency of sixty cycles—the windings, which on the higher frequency operated to produce a shunt-field lagging by substantially ninety degrees behind the impressed electromotive force, will now operate, by reason of the reduced frequency, to produce a shunt-field which will lag by something less than ninety degrees behind the impressed electromotive force. The phase of the shunt-field, due to the low-frequency current, may be indicated by the line $o\,a'$ in Fig. 5. It will be noted that this line does not lie at right angles to the line $o\,x$, and therefore it will be evident that the meter will not register accurately the energy consumed in the circuit to which it is connected. In order to increase the angle between the lines $o\,x$ and $o\,a'$ on the lower frequency, I provide an auxiliary winding 4 in inductive relation to the winding 2, and in the circuit with this winding I arrange a regulable resistance $r'$ and a switch 15, by means of which the winding may be short-circuited on itself. By closing this switch 15 when the motor is connected to the low-frequency circuits there is produced a new component in the magnetizations that go to make up the resultant shunt-field, this component having a phase relation, (indicated by the line $o\,b$ in Fig. 5.) By properly choosing the resistance of the circuit including the winding 4 it is evident that the resultant shunt-field may be shifted to exactly ninety degrees behind the impressed electromotive force, as represented by the line $o\,c$, Fig. 5.

The meter is of course calibrated on a high-frequency circuit, with the adjusting-switch in proper position for high frequency and on a low-frequency circuit with the said switch in its proper position for low frequency, so that in installing the meter it is only necessary to move the adjusting device or switch into the position corresponding to the frequency of the circuit to which it is to be connected.

While I have shown in the drawings the meter-windings so organized that the component $o\,b$ necessary at the low frequency is produced by a winding separate from the windings which are utilized for producing the shunt-field at high frequency, I desire it to be understood that my invention is not limited to this particular arrangement of windings, but consists, broadly, in the provision of an adjusting device or switch for changing the character of the shunt-winding as an entirety, so that with the switch in one position the meter will be adapted to circuits of a particular frequency and in another position to circuits of a widely-different frequency, and although I have illustrated a switch for making the required changes in the circuit connections it will be understood that an actual switch is not necessary. For example, in the arrangement shown instead of providing the terminals of the winding 4 with a switch the ends of the wire constituting the winding may be left free, so that they may be soldered together when it is desired to adapt the meter for the lower frequency.

What I claim as new, and desire to secure by Letters Patent of the United States, is—

1. An alternating-current meter provided with an adjusting device for changing the character of the shunt-winding to adapt the meter for currents of widely-varied frequencies.

2. In an alternating-current meter having its shunt-winding suitably arranged for currents of a predetermined frequency, an adjusting device for changing the character of the shunt-winding to adapt the meter for a current of a widely-different frequency.

3. An alternating-current meter calibrated for a plurality of frequencies, and adjusting means having different operative positions corresponding to the different frequencies.

4. A meter calibrated for a plurality of frequencies, and an adjusting-switch having an operative position corresponding to each of the frequencies for which the meter is calibrated.

5. In a meter calibrated for two different frequencies, a single circuit connection which when open adapts the meter for currents of one frequency and when closed adapts the meter for currents of the other frequency.

6. In combination in an electric meter for alternating currents, means for producing a series field, means for producing a shunt-field displaced by substantially ninety degrees from the series field, on non-inductive load, at a specified frequency, an armature acted upon by said fields and auxiliary means for modifying the phase of the shunt-field when the meter is supplied with currents of a different frequency.

7. In combination, in an electric meter for alternating currents, a series winding, a shunt-winding, means coöperating therewith to produce a shunt-field displaced by substantially ninety degrees from the series field, at a predetermined frequency, on non-inductive load, an armature in inductive relation to said windings, an auxiliary winding in inductive relation to the main shunt-winding and means for closing the circuit of said auxiliary winding to adapt the meter for a different frequency.

8. In combination, in an electric meter for alternating currents, a series winding, a shunt-winding, means coöperating therewith to produce a shunt-field displaced by substantially ninety degrees from the series field, at a predetermined frequency, on non-inductive load, an armature in inductive relation to said windings, an auxiliary winding arranged to coöperate with the main shunt-winding, and means for closing the circuit of said auxiliary winding to adapt the meter for a different frequency.

9. In combination in an electric meter for alternating currents, a series winding, a main shunt-winding, means for causing the current in said main shunt-winding to lag behind the impressed electromotive force, a second shunt-winding coöperating with the main shunt-winding to produce a resultant field lagging by substantially ninety degrees behind the series field, on non-inductive load, at a predetermined frequency, and auxiliary adjusting means for adapting the meter to a circuit of a different frequency.

10. In combination in an electric meter for alternating currents, a series winding, a main shunt-winding, means for causing the current in said main shunt-winding to lag behind the impressed electromotive force, a second shunt-winding coöperating with the main shunt-winding to produce a resultant field lagging by substantially ninety degrees behind the series field, on non-inductive load, at a predetermined frequency, and an auxiliary winding arranged to produce a ninety-degree relation at a different frequency.

In witness whereof I have hereunto set my hand this 28th day of January, 1901.

ELTON J. KING.

Witnesses:
W. S. MAY,
D. S. MYERS.